(No Model.) 2 Sheets—Sheet 1.

J. S. EITEMILLER.
STOCK WATERING TANK.

No. 576,777. Patented Feb. 9, 1897.

Witnesses
John Irmine
R. H. Bishop

Inventor
John S. Eitemiller
by Edgar G. Gaddis
Attorney

THE NORRIS PETERS CO., PHOTO-LITHO., WASHINGTON, D. C.

(No Model.) 2 Sheets—Sheet 2.

J. S. EITEMILLER.
STOCK WATERING TANK.

No. 576,777. Patented Feb. 9, 1897.

Witnesses
John Imire
R. W. Bishop

Inventor
John S. Eitemiller
by Edgar T. Gaddis
Attorney

UNITED STATES PATENT OFFICE.

JOHN SCOTT EITEMILLER, OF BEATRICE, NEBRASKA.

STOCK-WATERING TANK.

SPECIFICATION forming part of Letters Patent No. 576,777, dated February 9, 1897.

Application filed December 30, 1895. Serial No. 573,785. (No model.)

*To all whom it may concern:*

Be it known that I, JOHN SCOTT EITEMILLER, a citizen of the United States, residing at Beatrice, in the county of Gage and State of Nebraska, have invented certain new and useful Improvements in Stock-Watering Tanks; and I do hereby declare the following to be a full, clear, and exact description of the same.

My invention relates to improvements in devices for watering stock; and it consists in certain novel features hereinafter described and claimed.

Figure 1:
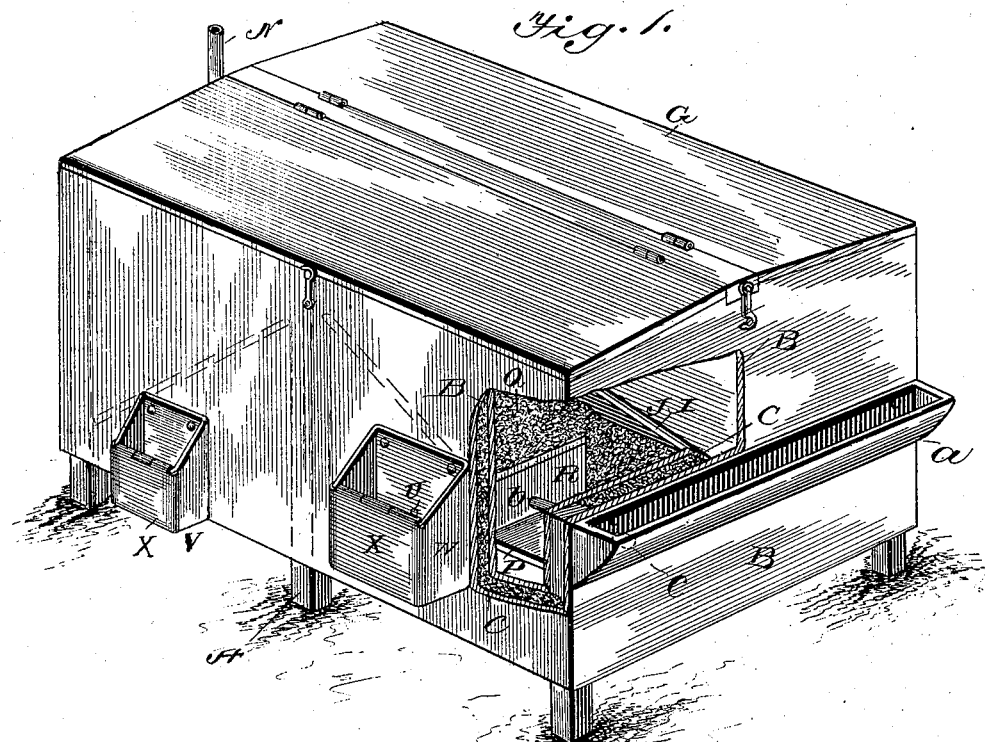
Figure 2:
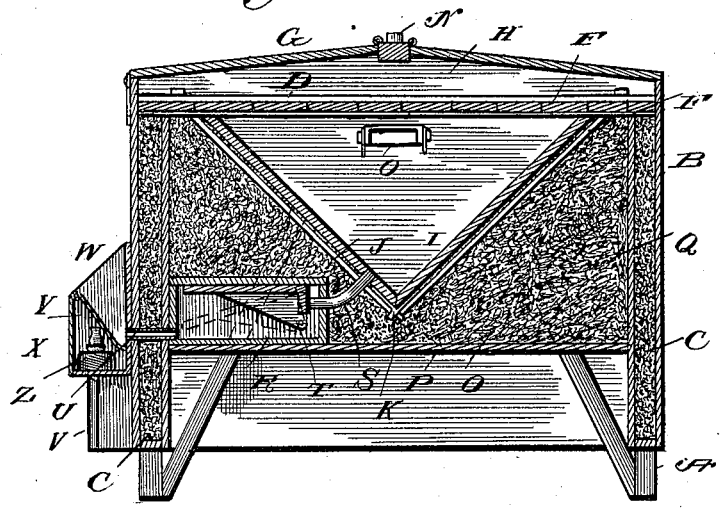
Figure 3:
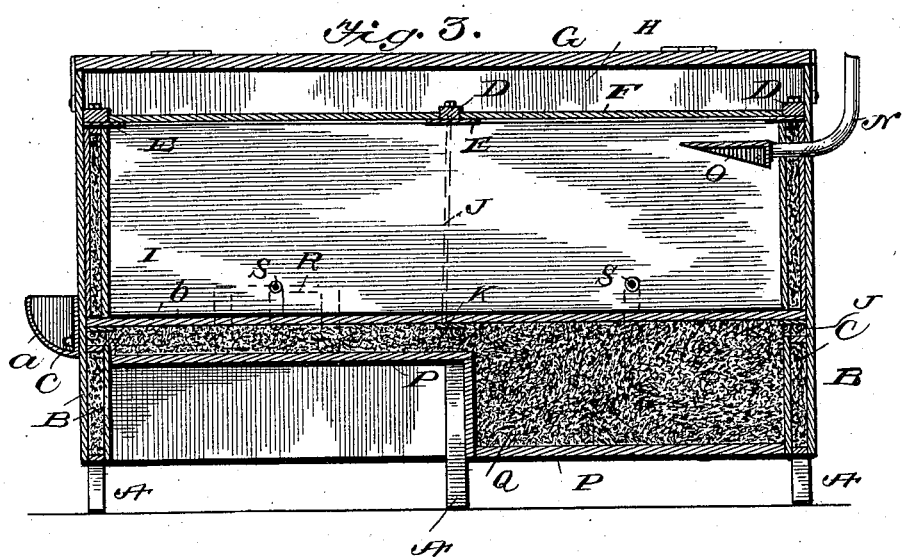
Figure 4:
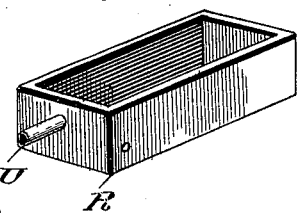
Figure 5:
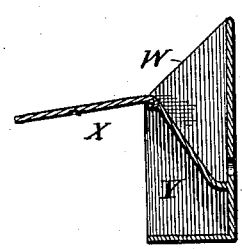
Figure 6:
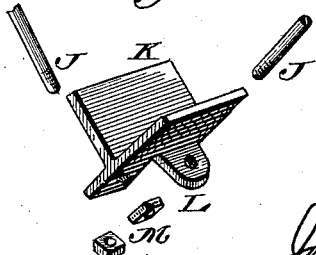

In the annexed drawings, Figure 1 is a perspective view of my improved tank, partly broken away. Fig. 2 is a transverse section of the same. Fig. 3 is a longitudinal section thereof. Fig. 4 is a view in detail, showing the automatic valve or cut-off. Fig. 5 is an enlarged section of the drinking-basin, and Fig. 6 is a detail perspective view of the retaining-lugs and cap at the bottom of the main tank.

In carrying out my invention I employ a series of vertical posts A, to which I secure the boards B, said boards forming a double wall, which is packed or filled with sawdust, chaff, or similar material, as shown at C, so as to prevent changes in the temperature of the atmosphere affecting the temperature of the device. Secured to and resting upon the upper ends of the posts A are the cross-beams D, to the under sides of which I secure the plates E, the edges of which project and form supports for the boards F, constituting the inner cover for the main tank or trough. The outer wall B is extended slightly above the inner wall, and upon this extended portion I rest the outer cover or top G, a dead-air space H being formed between the inner and outer covers.

Just below the inner cover and suspended from the cross-beams D is the main tank I, which is illustrated as being V-shaped in cross-section, but may be semicircular or of any other desired shape. The tank is supported by the downwardly-converging rods J, which have their upper ends fitted in the cross-beams and their lower ends passed through lugs L on caps K, which are secured to the lower edge of the tank. Nuts M are mounted on the ends of the rods beyond the lugs and adapted to be turned home against the same to secure the rods tightly in place. The supply-pipe N leads into one end of the tank, and within the tank I pivot on the end wall of the same the float-valve O, which is adapted to be raised by the water in the tank and forced against the end of the pipe to cut off the water and prevent the overflowing of the tank.

A platform P is arranged below the tank, and the space between the tank and said platform is filled with chaff, sawdust, or similar material, as at Q. Upon this platform I place the boxes R, which are connected with the main tank by the pipes S, as clearly shown. Within these boxes I pivot the float-valves T, which are caused to swing upward by the rising water in the boxes, so as to be forced against the ends of the pipes and cut off the flow of the water. The front ends of these boxes are connected by pipes U with the drinking-basins V W on the outside of the structure, the box V being lower than the box W, so that the large and small stock are enabled to drink separately. To the front edges of the drinking-basins I hinge the depending doors X, which close and form the front sides of the boxes V below the drinking-basins, said boxes being adapted to hold small lamps Z to prevent freezing of the water in winter. On one end or side of the structure I provide a trough *a*, which may be used when it is desired to have a large number of animals drink at one time and is connected with one of the boxes R by a pipe *b*, which is normally closed by a plug *c*. The trough is on the same level as the box, so that as it fills the water will rise in the box and operate the float-valve to arrest the flow and thereby prevent overflowing of the trough.

The operation of the device is thought to be obvious. The main or storage tank is filled from any suitable source of supply and the water is used by the animals as they need it. As the incoming water rises in the tank the float-valve will be forced against the end of the supply-pipe and the flow arrested. As the water is used from the tank the float will fall and the water permitted to again flow, thus maintaining a constant supply of fresh water in the tank. The water flows from the tank into the boxes R, and thence into the drinking-basins, the upper edges of which are above the level of the tops of the boxes, so that as the water rises in the basins the float-valves will be operated to cut off the flow, as will be readily understood. Overflowing of the basins is thus prevented and a small quantity of water always kept in the troughs ready for use by the stock.

The filling or packing employed by me prevents the water from freezing in cold weather and in summer keeps it cool and sweet. By employing the small lamps in the drinking-basins the chill is taken from the water in winter, so that it is always at the proper temperature to be used. It is obvious that the flow of the water is regulated automatically, so that the proper supply is always on hand.

The drinking-basins and the automatic valve may be used with the ordinary tank in common use.

Having thus described my invention, what I claim, and desire to secure by Letters Patent, is—

1. The combination with the frame, of a tank arranged therein, caps on the lower corners of the tank, consisting of diverging wings and lugs projecting from the said wings, rods secured in the frame passing downward below the tank and through the lugs, and securing-nuts fitted on the ends of the rods and adapted to be turned home against said lugs.

2. In a stock-watering device, the drinking-basin having a downwardly and rearwardly inclined bottom, a shelf projecting outwardly from the lower edge of the said bottom, and a door hinged to the upper edge of the bottom and depending therefrom to the shelf.

3. In a stock-watering device, the drinking-basin having a lamp-holding box formed in its bottom and provided with a swinging door depending from its front edge to form the front of said box.

4. The combination of the frame, having double walls filled with a non-conductor of heat, a tank supported within the frame, a dead-air space being provided over the tank, a platform below said tank, a temperature-proof filling between the platform and the tank, valve-boxes on said platform communicating with the tank, and drinking-basins supported on the frame and communicating with the valve-boxes.

In testimony whereof I affix my signature in the presence of two witnesses.

JOHN SCOTT EITEMILLER.

Witnesses:
GEO. TRUMBO,
J. B. HARSH.